United States Patent
Cundiff, Sr.

(10) Patent No.: US 6,466,534 B2
(45) Date of Patent: *Oct. 15, 2002

(54) ORIENTATION OF DRIVE MECHANICS TO ALLOW FOR DISC LOADING IN AN OFF-AXIS POSITION

(75) Inventor: Raymond M. Cundiff, Sr., Loveland, CO (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,036

(22) Filed: Oct. 4, 1999

(65) Prior Publication Data

US 2002/0006100 A1 Jan. 17, 2002

(51) Int. Cl.$^7$ ................................................ G11B 33/02
(52) U.S. Cl. ...................................... 369/75.2; 369/75.1
(58) Field of Search ............................. 369/77.1, 75.2, 369/75.1

(56) References Cited

U.S. PATENT DOCUMENTS

| | | | | |
|---|---|---|---|---|
| 4,744,072 A | * | 5/1988 | Tamaki et al. ............... | 369/75.2 |
| 4,862,445 A | * | 8/1989 | Sasaki ........................ | 369/75.2 |
| 5,737,304 A | | 4/1998 | Soga et al. .................. | 369/247 |
| 5,781,523 A | * | 7/1998 | Ozawa et al. ............... | 369/77.1 |
| 5,805,554 A | * | 9/1998 | Suzuki et al. ............... | 369/77.1 |
| 5,878,013 A | * | 3/1999 | Maeda et al. ............... | 369/77.1 |
| 5,930,218 A | | 7/1999 | Mitsui et al. ............... | 369/77.1 |

FOREIGN PATENT DOCUMENTS

| | | | |
|---|---|---|---|
| JP | 56-7266 | * | 1/1981 |
| JP | 10-302363 | * | 11/1988 |
| JP | 63-271754 | * | 11/1988 |
| JP | 1-150268 | * | 6/1989 |
| JP | 2-118983 | * | 5/1990 |
| JP | 5-198068 | * | 8/1993 |
| JP | 6-251479 | | 9/1994 |
| JP | 7-312074 | | 11/1995 |
| JP | 8-007430 | | 1/1996 |
| JP | 8-045153 | | 2/1996 |
| JP | 8-096565 | | 4/1996 |
| JP | 8-235715 | * | 9/1996 |
| JP | 9-134567 | | 5/1997 |
| JP | 9-245406 | | 9/1997 |
| JP | 9-251692 | | 9/1997 |
| JP | 9-251693 | | 9/1997 |
| JP | 9-320162 | * | 12/1997 |
| JP | 10-039761 | | 2/1999 |
| JP | 10-039762 | | 2/1999 |
| JP | 11-167760 | | 6/1999 |

* cited by examiner

Primary Examiner—William Klimowicz

(57) ABSTRACT

A device for receiving an optical disc to be transported to an optical drive is oriented off-axis to maintain an optical disc within such a receiving device during loading/unloading of the disc to/from an optical drive. In a preferred embodiment, the optical drive includes a receptacle operable to transport a disc to/from the optical drive, and such receptacle includes a cavity that receives the disc. In a preferred embodiment, such cavity is oriented at an acute angle θ from the vertical axis. In a more preferred embodiment, such angle θ has a value selected from approximately 5 degrees to approximately 45 degrees from the vertical axis. In a most preferred embodiment, angle θ is has a value selected from approximately 5 degrees to approximately 15 degrees from the vertical axis. Angle θ is sufficient to maintain the disc within the receptacle. In a preferred embodiment, the optical drive itself is oriented at angle θ from the vertical axis. In an alternative embodiment, the drive can be oriented vertically, and the receptacle for transporting the disc to the drive is oriented at angle θ from the vertical axis. In yet a further alternative embodiment, the receptacle can be oriented vertically, and the cavity that receives a disc within such receptacle is oriented at an angle θ from the vertical axis. In a preferred embodiment, a user can easily place a disc into the off-axis oriented receiving means with little effort and little potential for damaging the disc.

12 Claims, 3 Drawing Sheets

… (US 6,466,534 B2)

ORIENTATION OF DRIVE MECHANICS TO ALLOW FOR DISC LOADING IN AN OFF-AXIS POSITION

RELATED APPLICATIONS

This application is related to co-pending and commonly owned U.S. patent application Ser. No. 09/411,755 filed concurrently herewith, entitled "UNIQUE TRAY GEOMETRY TO ALLOW FOR VERTICAL LOADING OF OPTICAL DISC IN OPTICAL DRIVE, " and co-pending and commonly owned U.S. patent application Ser. No. 09/410,878 filed concurrently herewith, entitled "USING A TOP-HINGED SHUTTER ON A DRIVE TO SUPPLY A RETAINING FORCE TO HOLD A DISC IN POSITION FOR VERTICAL INSERTION," which are hereby incorporated herein by reference.

TECHNICAL FIELD

This application relates in general to optical drives, and in specific to a method, system and apparatus for off-axis loading/unloading an optical disc in an optical drive.

BACKGROUND

Optical discs, such as compact discs (CDs) and digital versatile discs (DVDs), are widely used for storing data, such as textual data, audio data, and video data. Optical drives are available in the prior art for reading data from and/or writing data to such optical discs. Mechanisms for reading data from and/or writing data to optical discs are well known within the prior art. For example, a typical optical drive comprises a servo for spinning the optical disc, a mechanism for providing a laser (e.g., a semiconductor laser), a lens for focusing the laser onto the optical disc, an optosensor or photodetector that receives the reflected light from the disc, and a mechanism that converts the received reflected light to electrical signals. Prior art optical drives typically include a carrier component or receptacle, such as a "tray," that operates to receive an optical disc and hold the disc in place while the disc is being transported or "fed" into the optical drive. For example, a personal computer (PC) can include a CD drive for reading CDs. Such CD drive will typically include a tray that extends from the drive to receive a CD, and then retracts back into the drive transporting such a received CD into the optical drive.

Optical drives have traditionally been positioned horizontally, such that an optical disc can lay flat on the optical drive's tray. That is, optical drives have traditionally been oriented along the horizontal axis. However, some optical drives of the prior art are positioned vertically, such that an optical disc is received into the drive in an upright position. That is, some prior art optical drives are oriented along the vertical axis. Because the optical disc is placed into the tray of a vertical optical drive in an upright position, rather than laying flat on such a tray (as with horizontal drives), a mechanism is required in the prior art for holding the optical disc securely in the tray. That is, a mechanism is required for prior art vertical drives for holding the optical disc securely in the drive's tray to prevent the optical disc from falling out of the tray. Typically, adjustable tabs have been utilized in the prior art to hold an optical disc in place in the tray. Such tabs generally extend from the edge of the tray over the optical disc to prevent the disc from falling out of the tray. Accordingly, prior art optical drives are typically either oriented along the horizontal axis, wherein an optical disc lays flat in the tray, or along the vertical axis, wherein tabs are required to maintain an optical disc in the tray.

Turning to FIG. 1, an example of a prior art optical drive's tray 102 is illustrated. As shown, adjustable tabs 104 are included on tray 102 to hold optical disc 106 in tray 102 as the tray retracts into the optical drive. Typically, such tabs 104 can be manually adjusted radially by a user to extend over optical disc 106. That is, a prior art tray 102 will typically include radially adjustable tabs 104 that can each be manually extended by a user to hold a disc 106 in tray 102 when positioned vertically. For example, as shown in FIG. 1, tabs $104_1$ and $104_2$ have been radially extended over optical disc 106 and tabs $104_3$ and $104_4$ have not been so extended by a user.

Generally, both horizontally positioned drives and vertically positioned drives of the prior art include such adjustable tabs 104. Horizontally positioned drives typically include such tabs 104 to allow users the ability to place the drive in a vertical, rather than horizontal position. For example, an optical drive can be included in a PC such that the drive is positioned horizontally when the PC's case is laying flat. However, the drive's tray may include adjustable tabs 104 to allow a user to reposition the PC such that the optical drive is positioned vertically (e.g., stand the case on its side), wherein the adjustable tabs can be manually extended by a user to allow an optical drive's tray 102 to hold an optical disc 106 in such a vertical position.

During operation, the optical drive typically lifts the optical disc off of the tray 102, such that the optical disc is clear of the tray's surface. Moreover, the adjustable tabs 104 are typically positioned at a height 110 above the optical disc 106 such that the optical disc does not contact the tabs 104 when lifted off of tray 102 (i.e., during operation of the optical drive). Typically, height 110 is approximately 5 millimeters. Accordingly, during operation, the optical drive's spindle lifts the optical disc 106 off of the tray 102, and the disc 106 spins beneath the adjustable tabs 104 without contacting such tabs 104. As a result, the overall height 108 of the tray 102 (which may also be thought of as the tray's "thickness" or the tray's "width" when the tray is oriented vertically) is required to be larger than the height 110 necessary for operating with the tabs 104 extended.

Alternatively, prior art tabs 104 may be elevationally adjustable, such that the tabs 104 raise or rotate upward away from optical disc 106. For example, an optical drive may elevationally adjust the tabs 104 by causing the tabs 104 to rotate upward away from optical disc 106 during operation of the drive to allow for sufficient space for the optical disc 106 to spin beneath the tabs 104. Thus, the height 110 may be reduced until disc 106 is transported into the optical drive, and thereafter height 110 is effectively increased by the optical drive elevationally adjusting the tabs 104. In such case, sufficient space is required once tray 102 is inserted within the optical drive to allow the tabs 104 to rotate upward away from optical disc 106 in the manner described above. Accordingly, height 108 of tray 102 is effectively increased because the tabs 104 must elevationally adjust within the optical drive. A prior art tray 102 typically has a height 108 of approximately 15 millimeters or more.

For ease of explanation and consistency, the dimension 108 of an optical disc tray will be referred to herein as the tray's "height" or "thickness" while the dimension 112 will be referred to herein as the tray's "length" and the dimension 114 will be referred to herein as the tray's "depth." Thus, for ease of explanation and consistency herein, the term "height" or "thickness" will be used to refer to dimension 108, the term "length" will be used to refer to dimension 112, and the term "depth" will be used to refer to dimension 114 of an optical drive's tray, regardless of whether such tray is oriented horizontally, vertically, or in any other manner.

Several problems exist with the above-described prior art. First, orienting an optical drive along the vertical axis has required a mechanism, such as tabs, to be implemented within the tray 102 to maintain an optical disc in the tray 102 in such vertical axis orientation. Utilizing adjustable tabs 104 requires that the overall height 108 of the tray 102 be larger than the height 110 necessary for operating with the tabs 104 extended. Accordingly, a low profile tray having a small overall height 108 is not available with prior art trays 102 having tabs 104. Additionally, tabs 104 are typically inconvenient for a user, and tabs 104 can damage an optical disc 106. Tabs 104 generally must be manually extended by a user. Accordingly, when operating an optical drive in a vertical position, a user is typically required to manually extend the tabs 104 to hold an optical disc 106 in tray 102 while the disc is fed to the optical drive.

Such adjustable tabs 104 require undesirable effort on the part of a user in loading and unloading an optical disc 106. A user can manually adjust the tabs 104 to load/unload a disc 106 in tray 102 such that the disc 106 does not encounter the tabs 104. For example, a user can place a disc 106 in tray 102 having tabs 104 retracted (i.e., not extended radially), and thereafter the user can manually extend the tabs 104 radially over disc 106. When the user desires to remove the disc 106, the user can manually retract the tabs 104 and then remove the disc 106 clear of the tabs 104. Manually adjusting the tabs 104 each time that a user loads/unloads a disc 106 is undesirable because it increases the amount of time and effort required in loading/unloading a disc 106. Additionally, adjusting (e.g., retracting/extending) the tabs 104 in this manner is cumbersome for a user because the user typically must hold the disc 106 in vertical tray 102 with one hand to prevent the disc 106 from falling out of the tray 102, while the user manually adjusts the tabs 104 with the user's other hand. Furthermore, such manual adjustment by a user of tabs 104 increases the potential that a user will inadvertently break or damage the tabs, thus reducing the life of the product.

Alternatively, tabs 104 can be extended by a user, and a user can physically force a disc 106 past the extended tabs 104 in loading/unloading disc 106. Thus, rather than manually adjusting the tabs 104 each time that a user loads/unloads a disc 106 to/from tray 102, the user may leave the tabs 104 extended and physically force an optical disc past the tabs during such loading/unloading. However, contacting the tabs 104 with disc 106 in this manner can damage disc 106 and possibly result in disc 106 being unreadable by an optical drive. That is, forcing a disc 106 past the extended tabs can scratch the reflective surface of the optical disc, which may result in data loss from the disc. Also, such tabs 104 are an additional part that must be manufactured and implemented within such prior art trays 102. Accordingly, the overall cost for manufacturing and assembling such prior art trays 102 are higher than if such additional tabs 104 were not required.

In view of the above, there exists a desire for a method, apparatus and system for loading/unloading an optical disc in an optical drive. There exists a further desire for a method, apparatus, and system for loading/unloading an optical disc in substantially a vertical orientation (e.g., within approximately a 15 degree angle of vertical). There exists a further desire for a method, apparatus and system for loading/unloading an optical disc in an optical drive that allow for a low profile receptacle to be implemented within an optical drive. There exists still a further desire for a method, apparatus and system that allow a user to easily perform loading/unloading of an optical disc in an optical drive. There exists still a further desire for a method, apparatus and system that require no added effort on the part of a user in loading/unloading an optical disc in an optical drive. There exists a further desire for a method, apparatus and system for loading/unloading an optical disc in an optical drive that reduce the potential for damaging an optical disc during such loading/unloading.

SUMMARY OF THE INVENTION

These and other objects, features and technical advantages are achieved by a system, apparatus and method which utilize unique off-axis orientation of a means for receiving an optical disc to be transported to an optical drive, wherein such off-axis orientation maintains an optical disc within the receiving means during loading/unloading of the disc. In a preferred embodiment, the optical drive comprises a receptacle that is operable to transport an optical disc to the optical drive. Such receptacle comprises a cavity that receives the optical disc. In a preferred embodiment, such cavity is oriented at an angle $\theta$ being an acute angle (i.e., less than 90°) from the vertical axis. In a more preferred embodiment, such angle $\theta$ has a value selected from approximately 5 degrees to approximately 15 degrees from the vertical axis to maintain the optical disc within the cavity. In a most preferred embodiment, angle $\theta$ is sufficient to prevent the optical disc from inadvertently falling out of the receptacle, while allowing the optical drive to be oriented substantially vertical (e.g., within approximately 15 degrees from vertical).

In a preferred embodiment the optical drive itself is oriented at angle $\theta$ from the vertical axis. In an alternative embodiment, the optical drive can be oriented vertically, and the receptacle for transporting the optical disc to the optical drive is oriented at angle $\theta$ from the vertical axis. In yet a further alternative embodiment, the receptacle can be oriented vertically, and the cavity that receives a disc within such receptacle is oriented at an angle $\theta$ from the vertical axis. That is, in such an alternative embodiment, the base of the cavity slopes inward to the receptacle from a lower portion of the cavity toward an upper portion of the cavity at angle $\theta$ from the vertical axis.

In a preferred embodiment, the optical drive is a stand-alone, external drive. For example, in a preferred embodiment, the optical drive is an external drive capable of interfacing with a larger system, such as a PC, laptop computer, mainframe computer, workstation computer, minicomputer, supercomputer, or other system capable of interfacing with an optical drive. However, in alternative embodiments, the optical drive is implemented as an internal drive within a computer system.

It should be appreciated that a technical advantage of a preferred embodiment of the present invention is that a system, method and apparatus for off-axis loading/unloading an optical disc in an optical drive are provided that allow easy loading/unloading of an optical disc with little effort on the part of a user and with little potential for damaging such optical disc. A further technical advantage of a preferred embodiment of the present invention is that a system, method and apparatus for off-axis loading/unloading an optical disc in an optical drive are provided wherein a user is not required to adjust any mechanisms, such as tabs, to maintain a disc in a transporting receptacle. Additionally, a fewer overall number of parts are required because separate mechanisms, such as tabs, for maintaining a disc in the transporting receptacle are eliminated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 2:
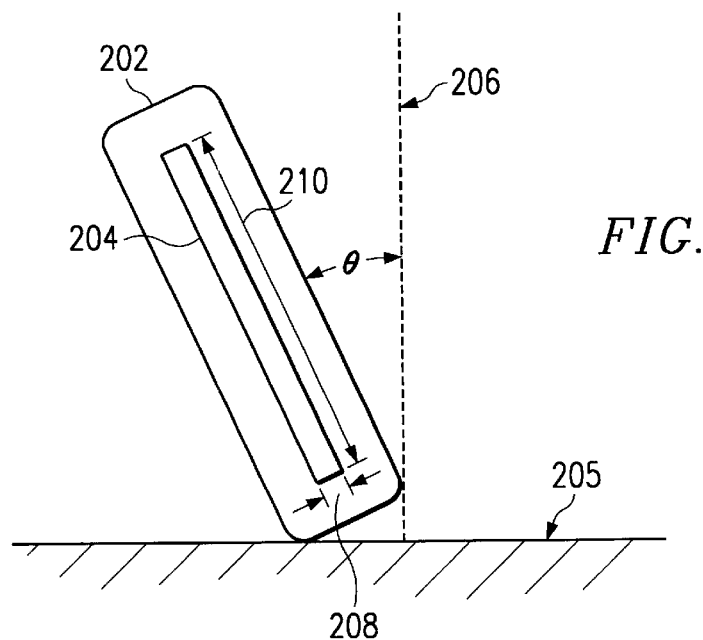
FIG. 2 shows a front view of a preferred embodiment for off-axis loading/unloading of an optical disc to/from an optical drive.

FIG. 2 shows a front view of a preferred embodiment of the present invention. As shown, optical drive 202 comprises receptacle 204 for receiving and transporting an optical disc to/from optical drive 202. In a preferred embodiment, optical drive 202 is oriented off-axis. That is, optical drive 202 is not oriented along vertical axis 206 or horizontal axis 205. As shown in FIG. 2, vertical axis 206 is orthogonal to horizontal axis 205. In a preferred embodiment, optical drive 202 is oriented at an angle θ from vertical axis 206. In such a preferred embodiment, horizontal axis 205 can be a surface, such as a table or the floor, upon which optical drive 202 is placed. In the preferred embodiment illustrated in FIG. 2, the entire optical drive is oriented at an angle θ from the vertical axis 206. By strategically positioning the optical drive 202 at an angle θ from vertical axis 206, an optical disc can be maintained in receptacle 204 during loading/unloading of such disc to/from optical drive 202. Thus, in a preferred embodiment, optical drive 202 is oriented in a non-horizontal and non-vertical position.

In a preferred embodiment, optical drive 202 is a stand-alone, external drive. For example, in a preferred embodiment optical drive 202 is an external drive capable of interfacing with a larger system, such as a PC, laptop computer, mainframe computer, workstation computer, minicomputer, supercomputer, or other system capable of interfacing with an optical drive. In a preferred embodiment, optical drive 202 is supported by a stand or other support mechanism that positions optical drive 202 at an angle θ from vertical axis 206. However, in alternative embodiments, orienting optical drive 202 at an angle θ may be accomplished through other means. For example, optical drive 202 may be implemented such that it stands at an angle θ without requiring a stand or other support mechanism.

In a preferred embodiment, angle θ is an acute angle from the vertical axis. Thus, in a preferred embodiment, angle θ is within the range of approximately 5 degrees to a value less than 90 degrees. Preferably, angle θ is less than 45 degrees from the vertical axis. In a most preferred embodiment, angle θ is within the range of approximately 5 degrees to approximately 15 degrees from vertical axis 206. Most preferably, angle θ is approximately 10 degrees from vertical axis 206. In a most preferred embodiment, angle θ is approximately 10 degrees from vertical axis 206 and has approximately +/−5 degrees tolerance, wherein angle θ may vary from approximately 5 degrees to approximately 15 degrees from vertical axis 206. Thus, in a most preferred embodiment, optical drive 202 is oriented in a substantially vertical position (e.g., within 15 degrees from vertical axis 206).

By orienting optical drive 202 at an angle θ, receptacle 204 is capable of maintaining an optical disc without requiring maintaining mechanisms, such as tabs, to prevent an optical disc from inadvertently falling out of receptacle 204. Thus, in a preferred embodiment, an optical disc can be placed in receptacle 204 without contacting any maintaining mechanisms, such as tabs. Accordingly, there is little potential for inadvertently damaging an optical disc during loading/unloading in a preferred embodiment. Moreover, in a preferred embodiment, a user is not required to manually adjust maintaining mechanisms, such as tabs, in order to hold a disc within receptacle 204. Accordingly, a user can easily insert and remove a disc from receptacle 204 with little effort. Also, because a user is not required to manually adjust maintaining mechanisms, such as tabs, the potential for the user inadvertently damaging the product may be reduced. Thus, the overall life span of the receptacle 204 may be increased. Furthermore, the overall number of parts required for maintaining a disc within receptacle 204 is reduced because maintaining mechanisms, such as tabs, are not required. Therefore, the manufacturing and assembling costs for optical drive 202 can be reduced in a preferred embodiment.

Figure 3:
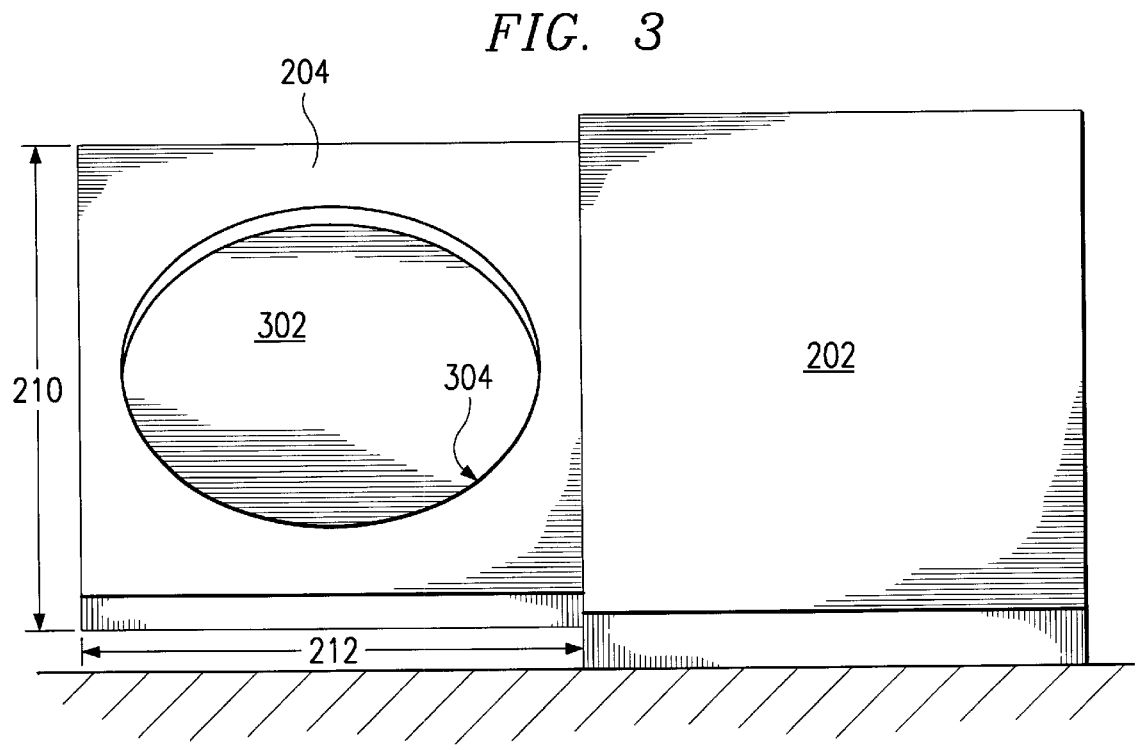
FIG. 3 shows a side view of a preferred embodiment for off-axis loading/unloading of an optical disc to/from an optical drive.

Turning to FIG. 3, a side view of a preferred embodiment is shown. As shown optical drive 202 comprises receptacle 204 (e.g., a tray) for transporting an optical disc to/from optical drive 202. Receptacle 204 comprises cavity 302 for receiving an optical disc to be transported to optical drive 202. Cavity 302 is formed by a sidewall or "rim" 304. Rim 304 is preferably of a substantially circular shape, and such rim 304 can completely or partially surround (or enclose) cavity 302. Thus, for example, rim 304 may be a contiguous circle surrounding cavity 302, or rim 304 may be a non-contiguous (e.g., broken) circle surrounding cavity 302. A user can place an optical disc, such as a CD or DVD, in the cavity 302 of receptacle 204, and such optical disc is maintained within such cavity 302 as a result of angle θ. In a most preferred embodiment, the optical drive is a CD drive. However, it should be understood that in alternative embodiments, the optical drive can be any type of optical drive, including a DVD drive. It should further be understood that any type of optical discs may be utilized in a preferred embodiment, including audio optical discs, video optical discs, and multimedia optical discs.

As an example of utilizing a preferred embodiment, suppose a user inserts an optical disc in receptacle 204 shown in FIGS. 2–3. The disc will fit into the cavity area 302 of receptacle 204 without scraping against or contacting any maintaining mechanisms, such as tabs, in a preferred embodiment. Accordingly, a user can easily insert and/or remove an optical disc from receptacle 204 without damaging the disc. Once the disc is placed in the cavity area 302 of receptacle 204, the user can release the disc. The will be maintained in the cavity area 302 as a result of angle θ. Thus, the disc will be fed properly to the optical drive 202. When a user unloads the disc from receptacle 204, the user removes the disc outward from receptacle cavity 302. Again, just as the disc was inserted in receptacle cavity 302 without contacting maintaining mechanisms, the disc can be removed from receptacle cavity 302 without contacting maintaining mechanisms. Moreover, the user is not required to perform any additional steps, such as adjusting tabs, to load/unload an optical disc to/from receptacle 204. The user is not required to exert any more effort than just placing the disc in receptacle cavity 302 and lifting the disc outward from receptacle cavity 302. The process of loading/unloading a disc is wieldy for a user and may be accomplished with one hand, as opposed to the cumbersome process of the prior art.

Figure 1:
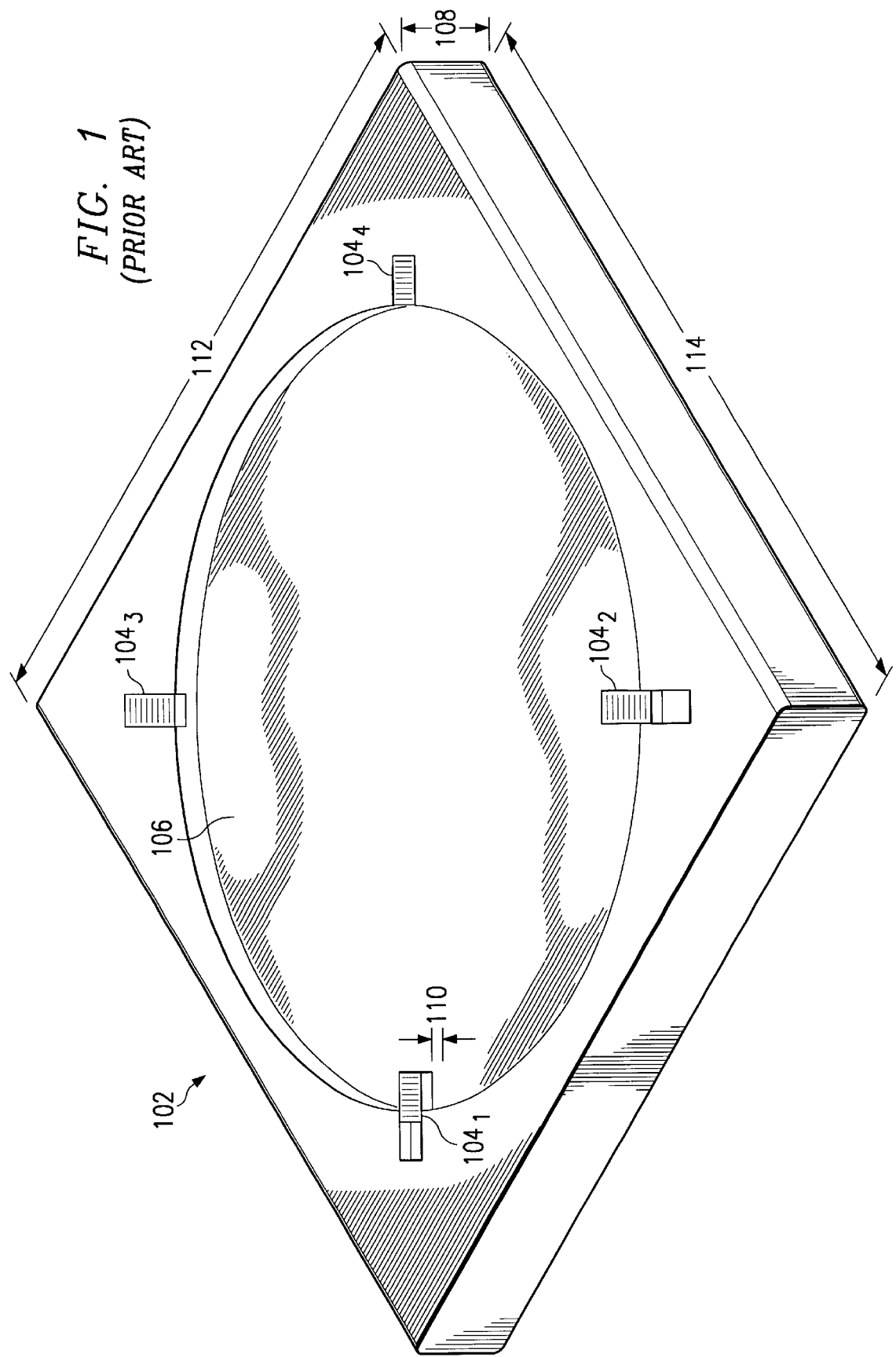
FIG. 1 shows a prior art tray for transporting an optical disc to an optical drive.

As discussed in conjunction with FIG. 1, for ease of explanation and consistency, the dimension 208 of optical disc receptacle 204 will be referred to herein as the receptacle's "height" or "thickness" (corresponding to dimension 108 of FIG. 1), the dimension 210 will be referred to herein as the receptacle's "length" (corresponding to dimension 112 of FIG. 1), and the dimension 212 will be referred to herein as the receptacle's "depth" (corresponding to dimension 114 of FIG. 1). Because maintaining mechanisms, such as tabs, are not required in a preferred embodiment, receptacle 204 can be implemented with a relatively small height dimension 208. In a preferred embodiment, the height 208 of receptacle 204 is within the range of 10–15 millimeters. In a most preferred embodiment, the height 208 of receptacle 204 is approximately 10 millimeters. Accordingly, a desired low profile is achieved for receptacle 204 in a preferred embodiment. As a result, optical drive 202 can have a low profile.

Figure 4:
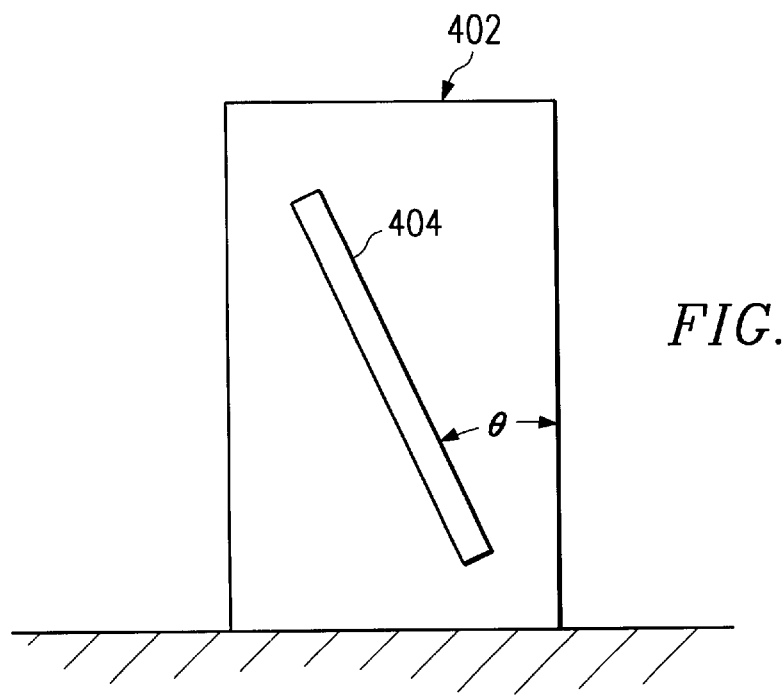
FIG. 4 shows a front view of an alternative embodiment for off-axis loading/unloading of an optical disc to/from an optical drive.

Turning to FIG. 4, an alternative embodiment is shown. As shown in FIG. 4, optical drive 402 can be implemented vertically with receptacle 404 oriented at an angle θ from vertical. Again, angle θ is an acute angle from vertical. Preferably angle θ is less than 45 degrees from vertical, and in a most preferred embodiment, angle θ is within the range of approximately 5 degrees to approximately 15 degrees from vertical. Most preferably, angle θ is approximately 10 degrees from vertical. Thus, in this alternative embodiment, optical drive 402 is oriented along the vertical axis and receptacle 404 is oriented off-axis. Most preferable, receptacle 404 is oriented substantially vertical (e.g., within approximately 15 degrees from vertical). Angle θ at which receptacle 404 is oriented permits an optical disc to be maintained within receptacle 404 during loading/unloading of such disc to/from optical drive 402, as discussed above in conjunction with FIGS. 2 and 3. It should be understood that in such an alternative embodiment, other components, such as the spindle and read/write head of optical drive 402 are oriented to correspond to receptacle 404. For example, read/write head of optical drive 402 is oriented at an angle θ within optical drive 402, wherein the read/write head is orthogonal to an optical disc received by optical drive 402. Thus, the read/write head of optical drive 402 is orthogonal to an optical disc received by optical drive 402 on receptacle 404 to allow for reading and/or writing operations for such an optical disc in a manner typically performed by a read/write head of an optical drive.

Figure 5:
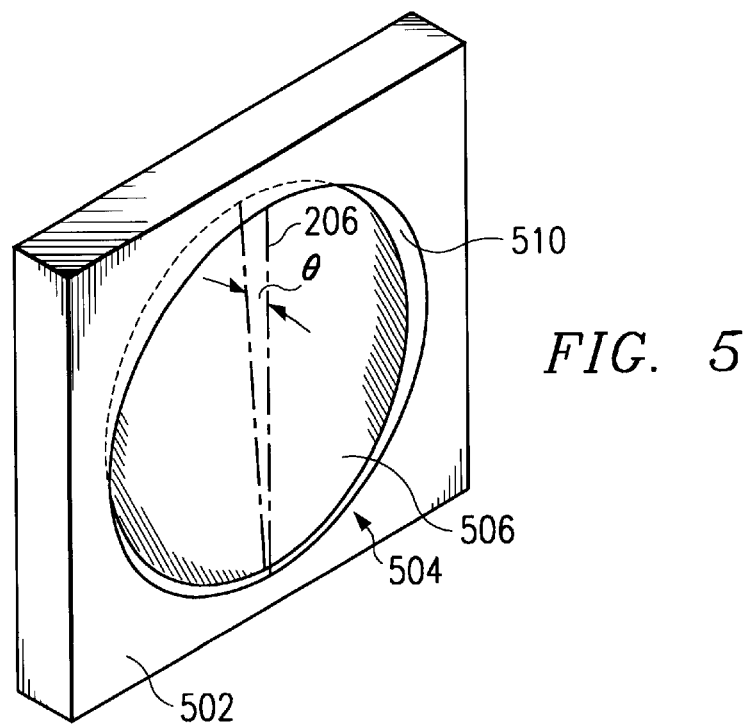
FIG. 5 shows another alternative embodiment for off-axis loading/unloading of an optical disc to/from an optical drive.

Turning to FIG. 5, another alternative embodiment is shown. As shown in FIG. 5, receptacle 502 comprises cavity 504 that is formed by rim 510. Cavity 504 comprises a surface or "base" 506 that is sloped at an angle θ. That is, base 506 slopes inward to receptacle 502 at an angle θ. As shown in FIG. 5, base 506 slopes inward from a lower portion of cavity 504 toward an upper portion of cavity 504 at angle θ. Again, angle θ is preferably within the range of approximately 5 degrees to a value less than 90 degrees. Thus, angle θ is preferably an acute angle from the vertical axis 206. Preferably, angle θ is less than 45 degrees, and most preferably angle θ is within the range of approximately 5 degrees to approximately 15 degrees from vertical axis 206. Most preferably, angle θ is approximately 10 degrees from vertical axis 206. Thus, in this alternative embodiment, receptacle 502 is oriented along vertical axis 206 and the base 506 of cavity 504 is oriented off-axis. Angle θ, at which base 506 slopes, permits an optical disc to be maintained within cavity 504 during loading/unloading of such disc to/from an optical drive (not shown), as discussed above in conjunction with FIGS. 2 and 3.

As with the alternative embodiment discussed in conjunction with FIG. 4, in this alternative embodiment, other components, such as the spindle and read/write head of the optical drive (not shown) can be oriented to correspond to the orientation of cavity 504. For example, the read/write head of the optical drive can be oriented at an angle θ within the optical drive, wherein the read/write head is orthogonal to an optical disc in cavity 504. Thus, the read/write head of the optical drive is orthogonal to an optical disc in cavity 504 to allow for reading and/or writing operations for such an optical disc in a manner typically performed by a read/write head of an optical drive. Alternatively, the spindle or other mechanism may straighten or orient the optical disc vertically within the optical drive such that the read/write head of the optical drive is orthogonal to the optical disc.

A preferred embodiment is implemented within an external optical drive. However, the present invention is not intended to be limited only to an external optical drive rather such an external optical drive is intended as an example that renders the disclosure enabling for many other implementations of an optical drive. For example, in alternative embodiments, an optical drive can be implemented within a larger system, such as a PC, mainframe computer, workstation computer, minicomputer, supercomputer, or other system having an optical drive. That is, an optical drive can be implemented as an internal drive for such a larger system that has the characteristics described herein. For example, in such an alternative embodiment, optical drive 202 can be integrated within a larger system (e.g., can be an internal optical drive) at an angle θ from the vertical axis. As other examples, the other alternative embodiments discussed in conjunction with FIGS. 4 and 5 can be integrated within such a larger system.

As described herein, a preferred embodiment does not require any maintaining mechanism, such as tabs. However, the present invention is not intended to be limited only to embodiments lacking a maintaining mechanism. Rather, the present invention is intended to encompass embodiments that include a maintaining mechanism for aiding in maintaining an optical disc in a receptacle for transporting such disc to the optical drive. For example, the mechanisms described in co-pending and commonly assigned U.S. patent application Ser. No. 09/411,755, entitled "UNIQUE TRAY GEOMETRY TO ALLOW FOR VERTICAL LOADING OF OPTICAL DISC IN OPTICAL DRIVE," can be implemented with the embodiments provided herein. As another example, the mechanisms described in U.S. patent application Ser. No. 09/410,878, entitled "USING A TOP-HINGED SHUTTER ON A DRIVE TO SUPPLY A RETAINING FORCE TO HOLD A DISC IN POSITION FOR VERTICAL INSERTION," can be implemented with the embodiments provided herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical drive comprising:

means for reading an optical disc; and means for receiving an optical disc to be transported to said means for reading an optical disc, wherein said means for receiving is oriented substantially along a vertical axis and wherein said means for receiving comprises a cavity for receiving said optical disc, said cavity comprising a base defining a depth of said cavity wherein said base slopes at an angle θ that is an acute angle from said vertical axis such that the depth at an upper portion of said cavity is greater than the depth at a lower portion of said cavity, and wherein said means for reading is oriented off said vertical axis at said angle θ during operation thereof.

2. The optical drive of claim 1 wherein said angle θ has a value selected from approximately 5 degrees to approximately 15 degrees from said vertical axis.

3. The optical drive of claim 1 wherein said optical drive is selected from the group consisting of:

a CD drive and a DVD drive.

4. The optical drive of claim 1 wherein said optical disc is selected from the group consisting of:

a CD, a DVD, an audio optical disc, a video optical disc, and a multimedia optical disc.

5. The optical drive of claim 1 wherein said optical drive is an external drive.

6. The optical drive of claim 1 wherein said optical drive is an internal drive within a computer system.

7. The optical drive of claim 1 wherein said means for receiving comprises a tray.

8. A system comprising:

an optical drive;

said optical drive comprising a receptacle that is operable to transport an optical disc to said optical drive, said receptacle oriented substantially along a vertical axis wherein said receptacle comprises a cavity that receives said optical disc, and wherein said cavity comprises a base defining a depth of said cavity and said base slopes at an angle θ having a value selected from approximately 5 degrees to a value less than 90 degrees from said vertical axis to maintain said optical disc within said cavity such that the depth at an upper portion of said cavity is greater than the depth at a lower portion of said cavity; and said optical drive further comprising an optical head oriented off said vertical axis at said angle θ during operation thereof.

9. The system of claim 8 comprising a computer system selected from the group consisting of:

a PC, a laptop computer, a mainframe computer, a workstation computer, a minicomputer, and a supercomputer.

10. The system of claim 8 wherein said optical drive is external to said system.

11. The system of claim 8 wherein said optical drive is internal to said system.

12. The system of claim 8 wherein said angle θ has a value selected from approximately 5 degrees to approximately 15 degrees from said vertical axis.

* * * * *